United States Patent
Dinh et al.

(10) Patent No.: US 7,622,090 B2
(45) Date of Patent: Nov. 24, 2009

(54) METHOD FOR SEPARATING URANIUM (VI) FROM ACTINIDES(IV) AND/OR ACTINIDES (VI) AND ITS USES

(75) Inventors: Binh Dinh, Pont Saint Esprit (FR); Michaël Lecomte, Avignon (FR); Pascal Baron, Bagnols sur Céze (FR); Christian Sorel, Villeneuve les Avignon (FR); Gilles Bernier, Avignon (FR)

(73) Assignees: Commissariat a l'Energie Atomique, Paris (FR); Compagnie General des Matieres Nucleaires, Velizy Villacoublay (FR)

( * ) Notice: Subject to any disclaimer, the term of this patent is extended or adjusted under 35 U.S.C. 154(b) by 340 days.

(21) Appl. No.: 10/549,101

(22) PCT Filed: Nov. 17, 2004

(86) PCT No.: PCT/FR2004/050594

§ 371 (c)(1),
(2), (4) Date: Sep. 13, 2005

(87) PCT Pub. No.: WO2005/052950

PCT Pub. Date: Jun. 9, 2005

(65) Prior Publication Data

US 2006/0147359 A1    Jul. 6, 2006

(30) Foreign Application Priority Data

Nov. 20, 2003   (FR)   ................... 03 50866

(51) Int. Cl.
| | |
|---|---|
| B01D 11/00 | (2006.01) |
| C01G 56/00 | (2006.01) |
| C01F 13/00 | (2006.01) |
| C01G 57/00 | (2006.01) |
| C01F 15/00 | (2006.01) |
| C01G 43/00 | (2006.01) |
| C01B 15/16 | (2006.01) |
| C01B 25/26 | (2006.01) |
| C01B 33/20 | (2006.01) |
| C01G 28/02 | (2006.01) |
| C01G 39/00 | (2006.01) |
| C01G 28/00 | (2006.01) |
| C01F 5/02 | (2006.01) |
| C07C 1/00 | (2006.01) |
| C09K 11/04 | (2006.01) |
| C09K 11/06 | (2006.01) |
| C01D 1/00 | (2006.01) |

(52) U.S. Cl. .................. 423/8; 423/2; 423/3; 423/9; 423/10; 423/11; 423/12; 423/15; 423/249; 423/250; 423/251; 423/254; 423/306; 423/314; 423/326; 423/606; 423/617; 423/635; 423/641; 252/643; 204/157.15; 588/18

(58) Field of Classification Search .................. 423/447
See application file for complete search history.

(56) References Cited

U.S. PATENT DOCUMENTS

| | | | | |
|---|---|---|---|---|
| 3,890,224 | A * | 6/1975 | Weiss et al. | ................. 210/671 |
| 4,196,136 | A | 4/1980 | Knoth, Jr. | |
| 4,659,551 | A * | 4/1987 | Kolarik et al. | ................. 423/10 |
| 4,787,979 | A | 11/1988 | Kolarik et al. | |
| 5,364,568 | A * | 11/1994 | Pope et al. | ................. 588/18 |
| 5,609,745 | A * | 3/1997 | Adnet et al. | ................. 205/43 |
| 6,413,482 | B1 * | 7/2002 | Baranov et al. | ................. 423/9 |

FOREIGN PATENT DOCUMENTS

FR    2 731 717    9/1996

OTHER PUBLICATIONS

Pochon et al. (Physical Chemistry Chemical Physics; vol. 2, pp. 3813-3818; 2000).*
Andrew J. Gaunt et al (The Structural and Spectroscopic Characterization of a Neptunyl Polyoxometalate Complex, Journal American Chemical Society, vol. 124 pp. 13350-13351, 2002).*
Zhou et al (Kinetic Studies on the oxidation of Uranium(IV) in Nitric Acid Solution, Journal Radioanalytic Nuclear Chemistry, Lettters 188 (3) pp. 177-187, 194).*

Taylor et al (The Oxidation of Neptunium(IV) by nitric acid in 100% TBP and diluted TBP/n-dodecane solutions, Journal of Alloys and Compounds, 271-273, pp. 817-820, 1998).*

The Merck Index, Merck & Co., Inc., Whitehouse Station, NewJersey, USA, 2006, Reference Page for Nitric Acid.*

* cited by examiner

*Primary Examiner*—Melvin C Mayes
*Assistant Examiner*—Guinever S Gregorio
(74) *Attorney, Agent, or Firm*—Brinks Hofer Gilson & Lione

(57) ABSTRACT

The invention relates to a method for separating uranium(VI) from one or more actinides selected from actinides(IV) and actinides(VI) other than uranium(VI), characterized in that it comprises the following steps:

a) bringing an organic phase, which is immiscible with water and contains the said uranium and the said actinide or actinides, in contact with an aqueous acidic solution containing at least one lacunary heteropolyanion and, if the said actinide or at least one of the said actinides is an actinide(VI), a reducing agent capable of selectively reducing this actinide (VI); and b) separating the said organic phase from the said aqueous solution.

Applications: reprocessing irradiated nuclear fuels, processing rare-earth, thorium and/or uranium ores.

19 Claims, 6 Drawing Sheets

METHOD FOR SEPARATING URANIUM (VI) FROM ACTINIDES(IV) AND/OR ACTINIDES (VI) AND ITS USES

TECHNICAL FIELD

The present invention relates to a method for separating uranium(VI) from one or more actinides(IV) and/or actinides (VI), and in particular thorium(IV), uranium(IV), plutonium (IV), neptunium(IV), plutonium(VI) and neptunium(VI), as well as to the uses of this method.

This method may be used particularly in the scope of a method for reprocessing irradiated nuclear fuels, especially in the scope of the first purification cycle of the PUREX method in order to decontaminate uranium with respect to neptunium, plutonium and/or thorium.

It may also be used in the scope of a method for processing rare-earth, thorium and/or uranium ores.

PRIOR ART

All plants for reprocessing irradiated nuclear fuels currently use the PUREX method (Plutonium Uranium Refining by EXtraction) to recover the uranium and plutonium present in these fuels.

This is done by using a plurality of purification cycles.

The first purification cycle is intended to decontaminate the uranium and plutonium jointly with respect to fission products, as well as to separate these two elements into two flows.

This cycle, as employed in European plants for reprocessing irradiated nuclear fuels, is represented in a schematic form in FIG. 3.

As this figure shows, the uranium and plutonium are co-extracted in a first so-called "extraction-washing" zone, the first in oxidation state (VI) and the second in oxidation state (IV), from the aqueous solution which contains them (and which is obtained by dissolving an irradiated fuel in an aqueous medium), by means of a solvent phase consisting of tributyl phosphate (TBP—extractant) at 30% strength by volume in hydrogenated tetrapropylene (TPH—diluent). This solvent phase is then washed with an aqueous acidic solution in order to complete the decontamination of the uranium and plutonium with respect to fission products. The effluent aqueous phase from this zone, referred to as "extraction raffinate", contains the fission products not extracted by the solvent phase and is removed from the cycle.

The solvent phase laden with uranium and plutonium is then sent to a so-called "plutonium back-extraction" zone where the plutonium undergoes selective reductive back-extraction. This back-extraction is carried out by reducing the plutonium from oxidation state (IV), which can be extracted by the solvent, to oxidation state (III) which is much less extractable, allowing it to enter an aqueous phase while the uranium remains in the solvent phase.

The aqueous phase leaving this zone and containing the back-extracted plutonium is sent to a so-called "uranium washing" zone where it is brought in contact with an unladen solvent phase intended to extract the uranium present in this aqueous phase. The solvent phase leaving this zone is then sent to the "plutonium back-extraction" zone.

The solvent phase leaving the "plutonium back-extraction" zone is itself sent to a so-called "plutonium barrier" zone where it is washed with an aqueous solution in order to back-extract the plutonium still present in the solvent phase. The aqueous phase leaving this zone is sent to the "plutonium back-extraction" zone.

The reducing agent used in the reductive plutonium back-extraction and the "plutonium barrier" is uranous nitrate which is combined with an anti-nitrous agent, in this case hydrazinium nitrate.

The solvent phase leaving the "plutonium barrier" is in turn sent to a so-called "uranium back-extraction" zone where the uranium is back-extracted by a weakly acidic aqueous phase, the entire operation being carried out 50° C.

In the first purification cycle represented in FIG. 3, neptunium is extracted in the "extraction-washing" zone, mainly in the form of neptunium(VI), jointly with uranium and plutonium. Next, during the selective plutonium back-extraction, the neptunium is reduced to oxidation state (IV) which can be extracted by the solvent and thus follows the uranium flow. This is therefore referred to as "joint uranium and neptunium recovery".

Three aqueous flows are therefore obtained during this first purification cycle: a first flow which contains some minor actinides and the other fission products, a second aqueous flow which contains the uranium and neptunium, and an aqueous flow containing the plutonium.

After a concentration operation, the uranium flow is treated in a second purification cycle.

As regards the plutonium flow, it undergoes one or two further successive purification cycles in order to complete the decontamination with respect to $\beta\gamma$ emitters, and to concentrate this flow.

In the scope of producing new plants for reprocessing irradiated nuclear fuels, it would be desirable to be able to simplify the PUREX method so as to optimize the investment, running and maintenance costs of such plants, but without compromising the performance of this method in terms of reprocessing yield and quality.

In fact, even if the saving was only a single extraction cycle, this would make it possible to reduce not only the number of instruments and amount of equipment necessary for carrying out the method, but also the volume of reagents consumed, the volume of effluents to be processed and the duration of the process, and consequently to reduce the size of the plants, their construction costs and their operating costs.

Experience shows that the uranium is sufficiently decontaminated with respect to $\beta\gamma$ emitters after the first purification cycle, and that the main benefit of the second uranium purification cycle is to separate the neptunium and possibly thorium which has followed the uranium flow.

The Inventors therefore set themselves the object of providing a method which makes it possible to separate uranium (VI) very efficiently from actinides existing in oxidation state (IV) and/or (VI), in particular neptunium, and which can be integrated in the first purification cycle of the PUREX method so as to make it possible to omit the second uranium purification cycle.

In order to solve a very different problem, namely the selective extraction of americium(III) from an aqueous nitric solution containing inter alia curium(III), FR-A-2 731 717 [1] in the joint names of the Applicants proposes to electrochemically oxidize americium(III) selectively (with respect to curium) into americium(VI), then to extract the americium (VI) from the said solution by bringing it in contact with an organic phase containing a suitable extractant such as tributyl phosphate or a dialkyl phosphoric acid.

In this method, which is known by the name SESAME, the americium(III) is oxidized by adding to the aqueous solution which contains it, on the one hand, a lacunary heteropolyanion, in particular potassium phosphotungstate and, on the other hand, an Ag(II) ion capable of oxidizing the americium (III) to americium(VI) while being reduced to Ag(I), and by electrolyzing the said solution under conditions such that the Ag(II) ion is electrochemically regenerated from the Ag(I) ion produced by the oxidation of americium.

In this case, because of its great ability to complex actinides(IV), the lacunary heteropolyanion thus contributes to stabilizing the americium(IV) and allowing its oxidation to americium(V), then to americium(VI) under the action of the electro-generated oxidant constituted by silver(II).

SUMMARY OF THE INVENTION

The Inventors have achieved the object which they set themselves by the present invention, which relates to a method for separating uranium(VI) from one or more actinides selected from actinides(IV) and actinides(VI) other than uranium(VI), characterized in that it comprises the following steps:

a) bringing an organic phase, which is immiscible with water and contains the said uranium and the said actinide or actinides, in contact with an aqueous acidic solution containing at least one lacunary heteropolyanion and, if the said actinide or at least one of the said actinides is an actinide(VI), a reducing agent capable of selectively reducing this actinide (VI); and b) separating the said organic phase from the said aqueous solution.

The method according to the invention uses the remarkable ability which lacunary heteropolyanions have to selectively complex actinides(IV) in an aqueous acidic medium, and thereby cause them to be transferred from an organic phase to an aqueous acidic phase.

Thus:

either the actinide or actinides intended to be separated from the uranium(VI) are all in oxidation state (IV) in the organic phase, in which case they are separated from the uranium(VI) by bringing this organic phase in contact with an aqueous acidic solution containing at least one lacunary heteropolyanion which, by complexing them, makes it possible to transfer them into this aqueous solution;

or the actinide or at least one of the actinides intended to be separated from the uranium(VI) is at oxidation level (VI) in the organic phase, in which case it is separated from the uranium(VI) by bringing this organic phase in contact with an aqueous solution which, besides at least one lacunary heteropolyanion, contains a reducing agent capable of converting this actinide(VI) to an oxidation state preventing it from being held in the said organic phase, but without reducing the uranium(VI).

Specifically, depending on the reducing agent being used, the said actinide may be reduced either to actinide(III) which, owing to its lack of affinity for the organic phase, is not retained by the latter; or to actinide(IV) which, being complexed by the lacunary heteropolyanion present in the aqueous acidic solution, is thus likewise not retained by the organic phase; or alternatively to oxidation state (V) if neptunium is involved. Neptunium enters the aqueous acidic solution, and is held in it, by two joint effects: on the one hand, the weak affinity of neptunium(V) vis-à-vis the organic phase and, on the other hand, the tendency which this element has when it is in oxidation state (V) to dismutate spontaneously into neptunium(IV) and neptunium(VI), a tendency which favours the presence of the lacunary heteropolyanion in the aqueous acidic solution because of its strong capacity for complexing actinides(IV). The neptunium (IV) resulting from the dismutation of neptunium(V) is complexed by the lacunary heteropolyanion of the aqueous acidic solution, while the neptunium(VI) produced by this dismutation is in turn reduced to neptunium(V) which will again dismutate into neptunium(IV) and (VI), and so on. All of the neptunium (VI) initially present in the organic phase will thus be in oxidation state (IV), complexed by the lacunary heteropolyanion in the aqueous acidic solutions.

The heteropolyanions are assemblies of oxo ions, obtained by condensation of oxometallic ions of formula $MO_4{}^{n-}$, in which M represents a metal selected from technetium (Tc), vanadium (V), niobium (Nb), tantalum (Ta), chromium (Cr), molybdenum (Mo) and tungsten (W), around an oxo ion of formula $XO_4{}^-$ in which X is a heteroatom, generally boron (B), silicon (Si), germanium (Ge), vanadium (Va), phosphorus (P), arsenic (As) or bismuth (Bi).

The heteropolyanions are referred to as "lacunary" when they have one or more lacunae in their structure, obtained by elimination of an $Mb_4{}^{n-}$ group.

In the scope of the present invention, the lacunary heteropolyanion or heteropolyanions are preferably selected from heterotungstates of formula $P_2W_{17}O_{61}{}^{10-}$, $As_2W_{17}O_{61}{}^{10-}$, $SiW_{11}O_{39}{}^{8-}$, $GeW_{11}O_{39}{}^{8-}$ and $PW_{11}O_{39}{}^{7-}$, since these have been found to be the most stable and form the strongest complexes with actinides(IV), regardless of the acidity of the aqueous solution.

These lacunary heterotungstates are advantageously used in the form of alkali metal salts, for example potassium, sodium or lithium salts.

The aqueous acidic solution preferably contains a silicotungstate of formula $SiW_{11}O_{39}{}^{8-}$, in particular potassium silicotungstate, because of the superior performance of silicotungstates in terms of both stability in an acidic medium and complexing the actinides(IV). Furthermore, assuming that the aqueous solution recovered after step b) is intended to be vitrified, silicotungstates have the advantage over heterotungstates of the type $P_2W_{17}O_{61}{}^{10-}$ or $As_2W_{17}O_{61}{}^{10-}$ that they facilitate this vitrification owing to the presence of a single silicon atom and a smaller number of tungsten atoms.

The concentration of lacunary heteropolyanion in the aqueous acidic solution is selected as a function of the organic phase's level of actinide(s) to be separated from the uranium (VI) and the volume ratio between the organic phase and the aqueous acidic solution which are brought in contact in step a).

This concentration is preferably such that the molar ratio between the lacunary heteropolyanion or heteropolyanions and the actinide or actinides to be separated from the uranium (VI) is from 2 to 10, and more preferably from 2 to 5, with an organic phase/aqueous solution volume ratio generally of from 5 to 10.

If metal ions other than actinides are also present in the organic phase, and if these ions are liable to be complexed by the lacunary heteropolyanion or heteropolyanions, then the concentration of lacunary heteropolyanion(s) in the aqueous acidic solution should be increased accordingly.

The aqueous acidic solution is preferably a nitric acid solution with an $HNO_3$ concentration generally of between 0.5 and 3 moles/l, depending on the actinide or actinides which are to be separated from the uranium(VI). For example, it is preferable for it to be of the order of 1 mole/l in the case of thorium(IV), uranium(IV), plutonium(IV), plutonium(VI) and neptunium(IV), and of the order of from 2 to 3 moles/l in the case of neptunium(VI).

When the aqueous acidic solution contains a reducing agent, the latter will be selected according to the oxidation level into which the actinide or actinides(VI) to be separated from the uranium(VI) are intended to be converted.

For instance, this or these actinides(VI) may be reduced to actinides(III) or (IV) by using a relatively energetic reducing agent such as uranous nitrate, whereas a gentler reducing agent is used in order to reduce neptunium(VI) to neptunium (V), for example hydroxylamine nitrate.

In order to avoid parasitic re-oxidation phenomena, this reducing agent is preferably used in conjunction with an anti-nitrous agent (commonly referred to as a "nitrous scavenger"), i.e. a compound capable of breaking down nitrous acid by reacting with it.

According to the invention, this anti-nitrous agent is preferably hydrazine, which breaks down nitrous acid by the following reactions:

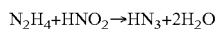

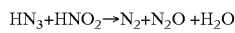

Furthermore, in the case of reducing neptunium(VI) to neptunium(V), step a) is preferably carried out hot, i.e. in practice at a temperature of from 45 to 60° C., in order to accelerate the reduction of neptunium(VI) and the dismutation of neptunium(V) into neptunium(IV) and neptunium (VI).

According to the invention, the organic phase may comprise either a solvent in the conventional sense of the term, which is organic, immiscible with water and has a strong affinity vis-à-vis the uranium(VI) and the actinide or actinides which are intended to be separated, or a solvent in the sense with which this term is used in hydrometallurgy, i.e. a mixture of an extractant of the uranium(VI) and the actinide or actinides which are intended to be separated, and a diluent which is immiscible with water and chemically inert.

In order to complete the separation of the uranium(VI) from the one or more actinides (IV) and/or (VI), the method according to the invention also comprises an operation which consists in bringing the aqueous solution obtained after step b) in contact with an organic phase which has an affinity vis-à-vis uranium(VI), since such an operation makes it possible to recover the uranium(VI) fraction liable to have been back-extracted during step a) of the method.

For this washing, the aqueous solution obtained after step b) is brought in contact with the organic phase with an affinity vis-à-vis uranium(VI), then the said aqueous solution is separated from the said organic phase.

This organic phase may consist either of an organic solvent which is immiscible with water and has a strong affinity vis-à-vis uranium(VI), or an uranium(VI) extractant mixed with a diluent which is immiscible with water and chemically inert.

The method according to the invention is highly advantageous because it makes it possible to separate uranium(VI) very efficiently from actinides(IV) and/or (VI) such as thorium(IV), uranium(IV), plutonium(IV), neptunium(IV), plutonium(VI) and neptunium(VI), while being simple to carry out since it employs liquid-liquid extraction operations.

In this regard, it can be used in all the apparatus conventionally used for carrying out liquid-liquid extractions.

In particular, it can be used for continuously separating uranium(VI) from one or more actinides selected from actinides(IV) and (VI) other than uranium in multistage contactors such as those used in methods for reprocessing irradiated fuels.

The invention therefore also relates to the use of a method as described above in the scope of a method for reprocessing irradiated nuclear fuels.

In particular, the invention also relates to the use of the method as described above in the scope of the first purification cycle of the PUREX method.

In the event that this first purification cycle is a cycle with joint recovery of uranium and neptunium, then the method according to the invention may in particular be employed either after the "plutonium barrier" operation in order to decontaminate the uranium, present in the solvent phase obtained after this operation, with respect to neptunium, or after the "plutonium back-extraction" operation in order to decontaminate the uranium, present in the solvent phase obtained after this operation, with respect to neptunium and optionally with respect to plutonium in the event that this phase still contains plutonium.

In this case, the solvent phase resulting from the "plutonium barrier" operation is preferably subjected to an oxidation operation, for example using nitric vapours, in order to oxidize the excess uranium(IV), which it contains, into uranium(VI) before being subjected to step a) of the method according to the invention, this being in order to avoid the use of too great a quantity of lacunary heteropolyanion(s) during step a) of the method according to the invention.

With the uranium, neptunium and possibly plutonium then being in oxidation state (VI) in the solvent phase, step a) of the method according to the invention is carried out by using an aqueous nitric solution which has a molarity ranging from 2 to 3 and contains at least one lacunary heteropolyanion, hydroxylamine nitrate and hydrazine, at a temperature of the order of 45° C.

In the event that the first purification cycle of the PUREX method is a cycle with joint recovery of plutonium and neptunium, then the method according to the invention may in particular be employed after the "plutonium back-extraction" operation in order to decontaminate the uranium, present in the solvent phase obtained after this operation, with respect to neptunium in the event that this phase still contains these two elements.

In this case, step a) of the method according to the invention can be carried out without a prior oxidation operation.

Furthermore, with the neptunium and plutonium normally being in oxidation state (IV) in the solvent phase obtained after the "plutonium back-extraction" operation, step a) of the method according to the invention may be carried out by using an aqueous nitric solution which has a molarity close to 1 and contains at least one lacunary heteropolyanion, at ambient temperature. Nevertheless, it is also possible to carry it out by using an aqueous acidic solution which has a molarity ranging from 2 to 3 and contains at least one lacunary heteropolyanion, hydroxylamine nitrate and hydrazine, at a temperature of the order of 45° C in order to overcome any possible malfunction of the "plutonium back-extraction" operation liable to entail incomplete reduction (or re-oxidation) of the neptunium and plutonium.

In view of the uranium(VI) decontamination factors obtained experimentally by the Inventors when using the method according to the invention, integration of this method in the first purification cycle of the PUREX method appears to make the second uranium purification cycle superfluous and, in the event that it is used after the "plutonium back-extraction" operation, makes it possible to obviate the "plutonium barrier".

This results in a considerable simplification of the PUREX method.

Other characteristics and advantages of the invention will become more readily apparent on reading the rest of the description which follows, given of course by way of illustration without implying any limitation, and with reference to the appended drawings.

DETAILED DESCRIPTION OF EMBODIMENTS

Figure 1:
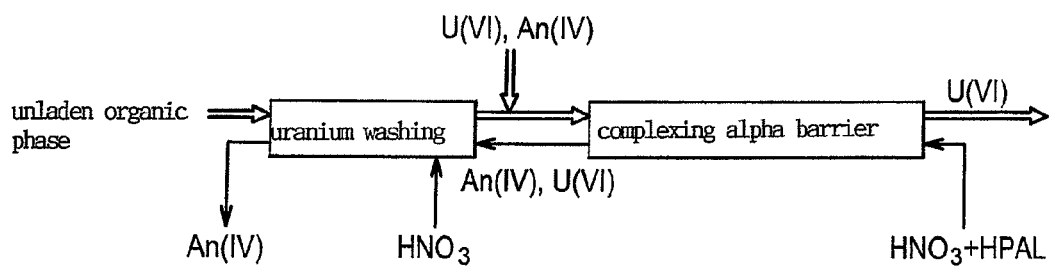
FIG. 1 schematically represents a first exemplary embodiment of the method according to the invention for continuously separating uranium(VI) from actinides(IV) present in the same organic flow.

Reference will first be made to FIG. 1, which schematically represents a first embodiment of the method according to the invention for separating uranium(VI) from actinides(IV) present in the same organic flow which, besides these elements, comprises for example a uranium(VI) extractant and actinides(IV) in a diluent.

In this example, the method according to the invention is used continuously in two multistage countercurrent contactors.

As can be seen in FIG. 1, the organic flow laden with uranium(VI) and actinides(IV) is thus brought to a first contactor, referred to as a "completing alpha barrier" in FIG. 1, where it is brought in contact with an aqueous acidic solution, for example a nitric solution with a molarity close to 1, also containing a lacunary heteropolyanion (HPAL), advantageously a silicotungstate.

The organic flow and the aqueous acidic solution are preferably brought in contact in a ratio of from 5 to 10 in order to limit the effluent volumes.

The organic phase leaving the first contactor essentially contains the uranium(VI), while the aqueous phase leaving this contactor contains the actinides(IV) complexed by the HPAL, as well as a fraction of uranium(IV) having been back-extracted jointly with these actinides.

This aqueous phase is sent to a second contactor, referred to as "uranium washing" in FIG. 1, where its acidity is adjusted to between 1 M and 2 M by adding nitric acid and it is brought in contact with an unladen organic phase, for example a phase consisting of the same extractant and the same diluent as those present in the organic phase arriving at the first contactor. This washing makes it possible for the uranium(VI) fraction having been back-extracted during the previous operation to be recovered in the said organic phase.

The organic phase leaving the second contactor, laden with uranium(VI), is sent to the entry of the first contactor while the aqueous phase leaving the second contactor, which now contains only the actinides(IV) complexed by the HPAL, is itself removed from the circuit.

Figure 2:
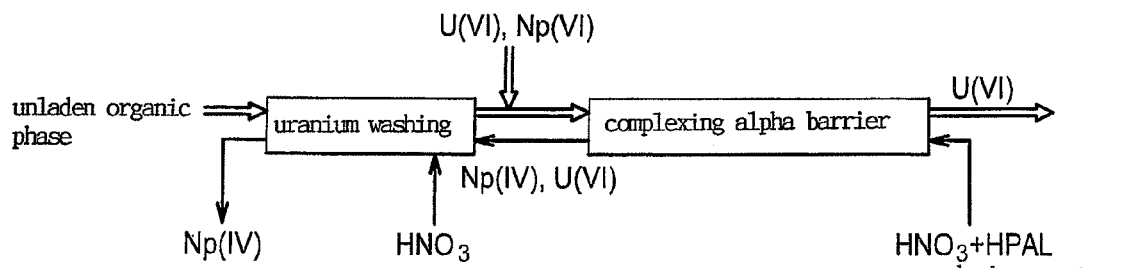
FIG. 2 schematically represents a second exemplary embodiment of the method according to the invention for continuously separating uranium(VI) from actinides(IV) present in the same organic flow.

FIG. 2 schematically represents a second embodiment of the method according to the invention which, this time, is intended to separate uranium(VI) from neptunium(VI) when they are present in the same organic flow.

Here again, this organic flow may comprise an extractant in a diluent besides the uranium(VI) and neptunium(VI).

In this embodiment, example, the method is also carried out continuously in two multistage countercurrent contactors.

As can be seen in FIG. 2, the organic flow laden with uranium(VI) and neptunium(VI) is brought to a first contactor, referred to as a "completing alpha barrier" in FIG. 2, where it is brought in contact with an aqueous acidic solution, for example a nitric solution with a molarity ranging from 2 to 3, also containing a lacunary heteropolyanion (HPAL), advantageously a silicotungstate, a relatively non-energetic reducing agent such as hydroxylamine nitrate, and an antinitrous agent, for example hydrazine.

This contact is advantageously carried out in an organic phase/aqueous nitric solution volume ratio of from 5 to 10, and at a temperature of 45° C. in order to obtain sufficiently fast neptunium redox kinetics.

The organic phase leaving the first contactor essentially contains the uranium(VI), while the aqueous phase leaving this contactor contains the neptunium(IV) complexed by the HPAL, as well as a fraction of uranium(VI) having been back-extracted jointly with the neptunium.

As in the previous example, this aqueous phase is sent to a second contactor, referred to as "uranium washing" in FIG. 2, where it is brought in contact with an unladen organic phase then separated from this phase so that the uranium(VI) fraction having been back-extracted during the previous operation can be recovered in it.

The organic phase leaving the second contactor, laden with uranium(VI), is sent to the entry of the first contactor while the aqueous phase leaving the second contactor, laden with neptunium(IV) complexed by the HPAL, is itself removed from the circuit.

Figure 3:
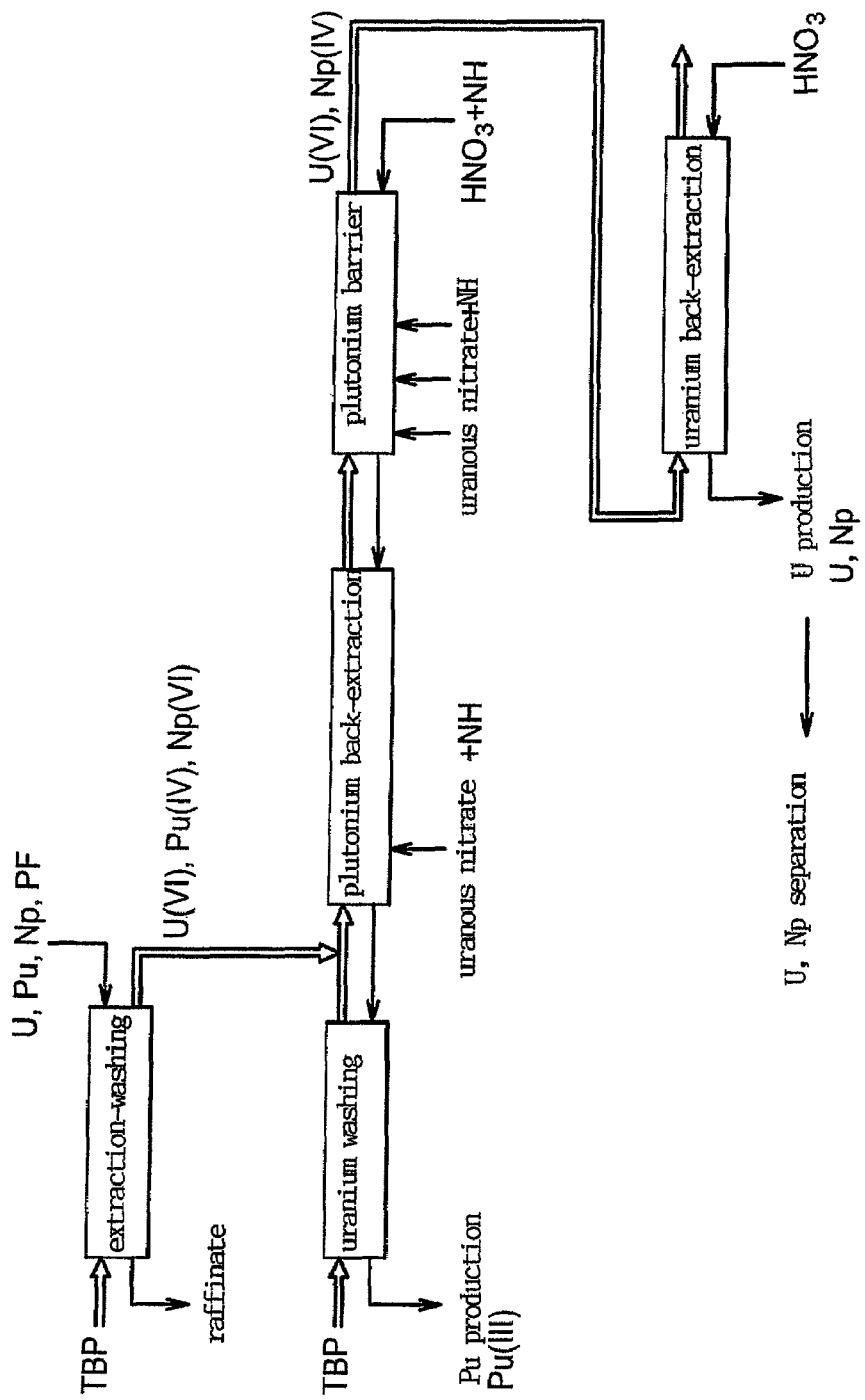
FIG. 3 represents a block diagram of the first purification cycle of the PUREX method as employed in European plants for reprocessing irradiated nuclear fuels.
Figure 4:
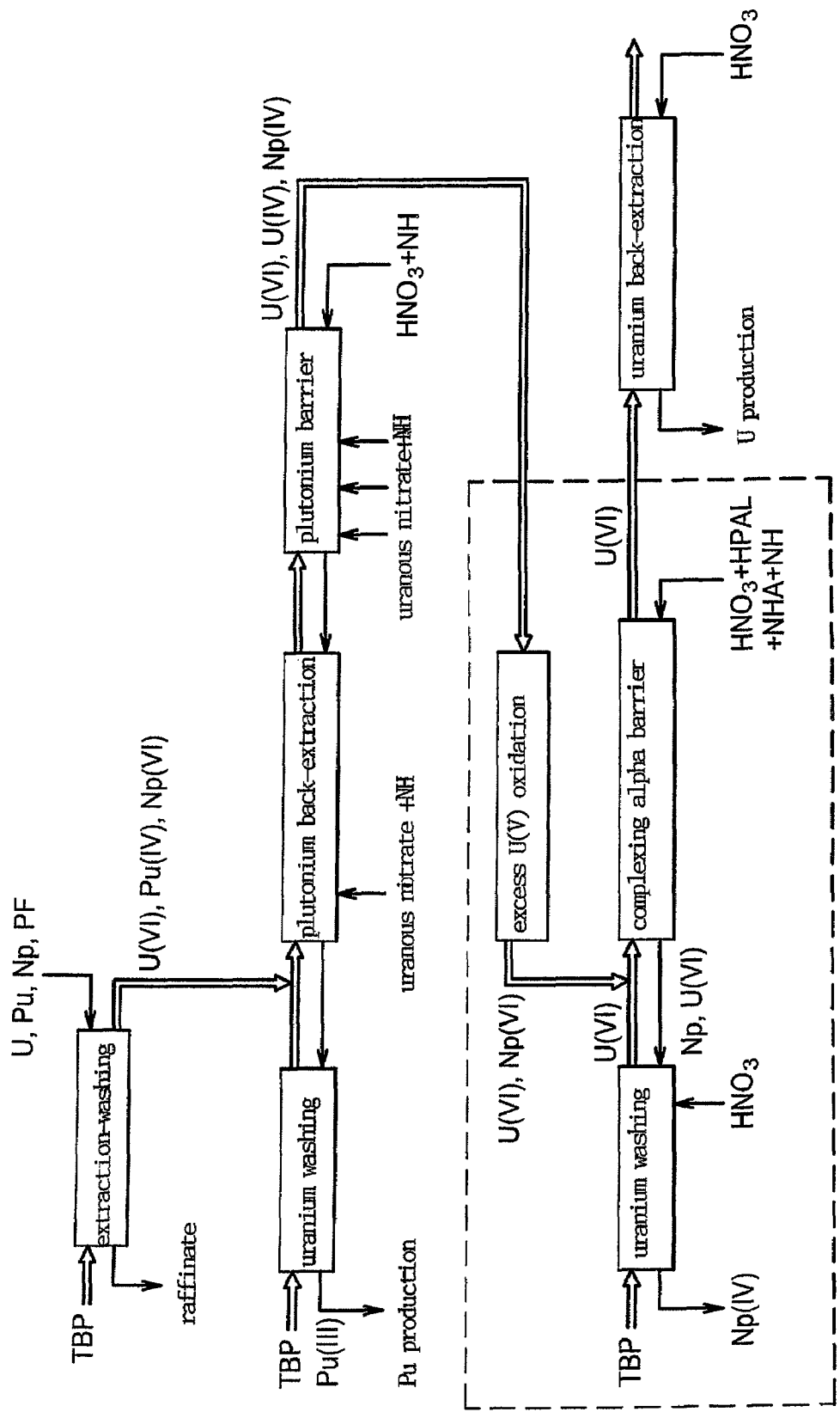
FIG. 4 represents a block diagram of an example of the method according to the invention being integrated in the first purification cycle of the PUREX method as illustrated in FIG. 3.

Reference will now be made to FIG. 4, which schematically represents an example of the method according to the invention being integrated in the first purification cycle of the PUREX method as employed in European plants for reprocessing irradiated nuclear fuels, this cycle itself being schematized in FIG. 3.

In order to make them more visible, the additional steps which FIG. 4 contains in relation to FIG. 3 are written inside a dashed box.

As a reminder, the first purification cycle as shown in FIG. 3 is a cycle in which neptunium is recovered jointly with uranium.

Specifically, the neptunium contained in the aqueous solution obtained by dissolving the irradiated fuel is extracted, mainly in the form of neptunium(VI), in the "extraction-washing" zone jointly with the uranium and plutonium, the first being in oxidation state (VI) while the second is in oxidation state (IV).

This neptunium(VI) is then reduced during the selective plutonium back-extraction step to neptunium(IV), which can be extracted by the solvent phase. It therefore remains with the uranium in the solvent phase during this step, while the plutonium enters an aqueous phase.

In the example illustrated in FIG. 4, the method according to the invention is thus used between the "plutonium barrier zone" and the "uranium back-extraction" zone in order to decontaminate the uranium, present in the solvent phase leaving the "plutonium barrier", with respect to neptunium.

This solvent phase contains uranium(VI), excess uranium (IV) (corresponding to the uranous nitrate used as a reducing agent for the selective plutonium back-extraction), and a minor quantity of neptunium(VI).

Since complexing this excess uranium(IV) by a lacunary heteropolyanion is liable to require a very large quantity of lacunary heteropolyanion, it is desirable to oxidize it to uranium(VI) before the solvent phase is treated using the method according to the invention.

With the uranium and neptunium thus being in oxidation state (VI) in this phase, the method according to the invention can be carried out according to a diagram similar to that shown in FIG. 2, with:

the solvent phase being brought in contact with an aqueous nitric solution containing a lacunary heteropolyanion (HPAL), hydroxylamine nitrate (NHA) and hydrazine (NH) in a first contactor, referred to as a "complexing alpha barrier" in FIG. 4, at a temperature of the order of 45° C., then the aqueous phase leaving the first contactor being washed in a second contactor, referred to as "uranium washing" in FIG. 4, with a solvent phase consisting of tributyl phosphate (TBP) at 30% strength in hydrogenated tetrapropylene (TPH) in order to recover the uranium(VI) fraction having been back-extracted during the previous operation.

The organic phase leaving the second contactor, which is laden with neptunium(IV) complexed by the HPAL, is removed from the cycle and sent to a vitrification unit.

The organic phase leaving the second contactor, laden with uranium(VI), is sent to the first contactor while the organic phase leaving the first contactor, laden with uranium(VI), is sent to the "uranium back-extraction" zone where the uranium(VI) will be back-extracted as is customary in the first purification cycle of the PUREX method as illustrated in FIG. 3.

Figure 5:
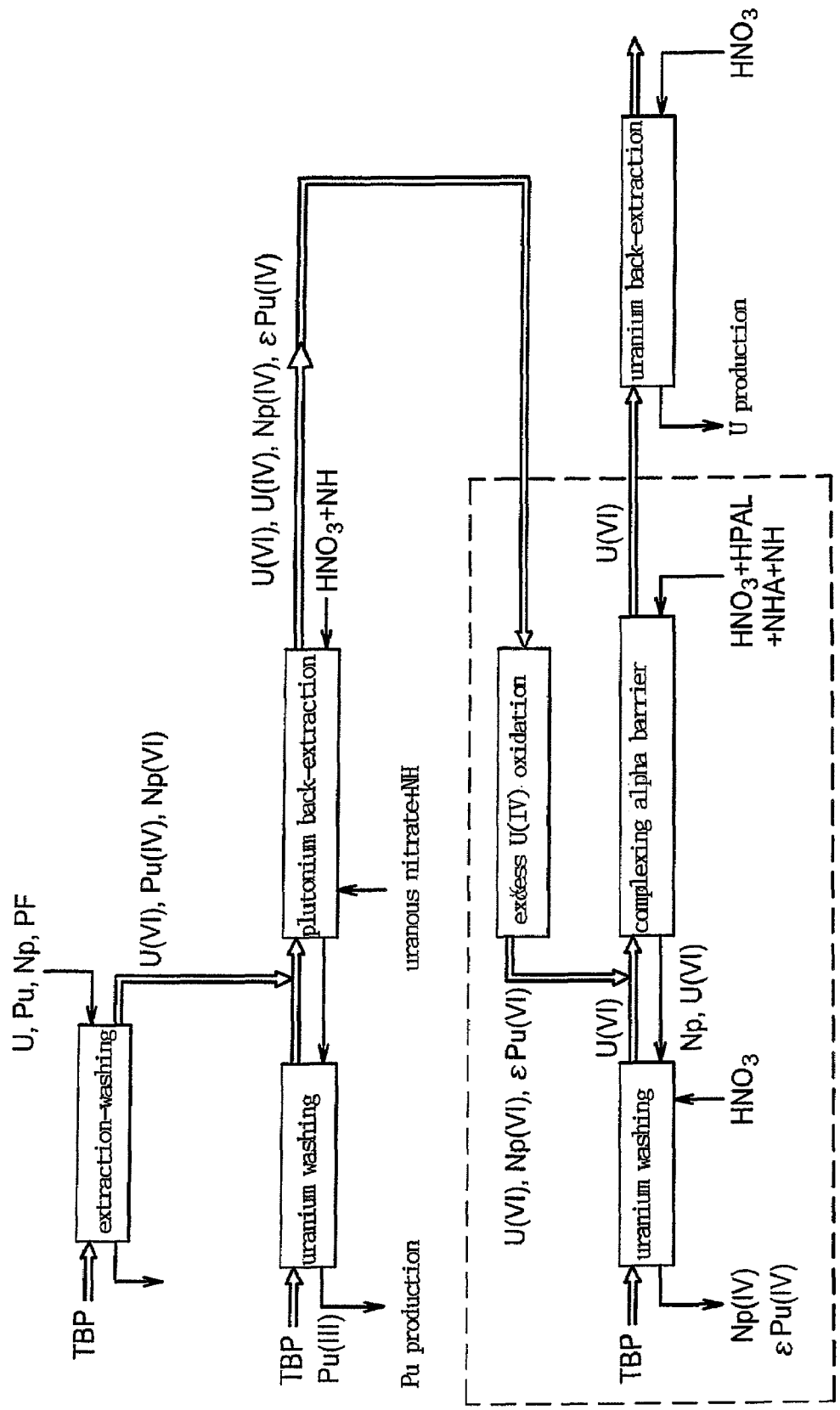
FIG. 5 represents a block diagram of a second example of the method according to the invention being integrated in the first purification cycle of the PUREX method as illustrated in FIG. 3.

FIG. 5 schematically represents a second example of the method according to the invention being integrated in the first purification cycle of the PUREX method as illustrated in FIG. 3. Here again, the additional steps which FIG. 5 contains in relation to FIG. 3 are written inside a dashed box.

In this example, the method according to the invention is employed just after the "plutonium back-extraction" zone in order to decontaminate the uranium, present in the solvent phase leaving this zone, with respect to neptunium and optionally plutonium if it is found to still contain plutonium.

This solvent phase contains uranium(VI), excess uranium (IV), neptunium(IV), and possibly plutonium(IV).

As before, this excess uranium(IV) is oxidized to uranium (VI), for example by nitric vapours, then the method according to the invention is carried out as described with reference to FIG. 4 in two multistage contactors, respectively referred to as "complexing alpha barrier" and "uranium washing" in FIG. 5.

The aqueous phase leaving the second contactor, which is laden with neptunium(IV) and possibly plutonium, these being complexed by the lacunary heteropolyanion, is removed from the cycle and sent to a vitrification unit.

The organic phase leaving the second contactor, laden with uranium(VI), is sent to the first contactor while the organic phase leaving the first contactor, laden with uranium(VI), is sent not to the "plutonium barrier" zone which can be omitted since it is made superfluous by the method according to the invention, but directly to the "uranium back-extraction" zone where the uranium(VI) will be back-extracted as is customary in the first purification cycle of the PUREX method as illustrated in FIG. 3.

Figure 6:
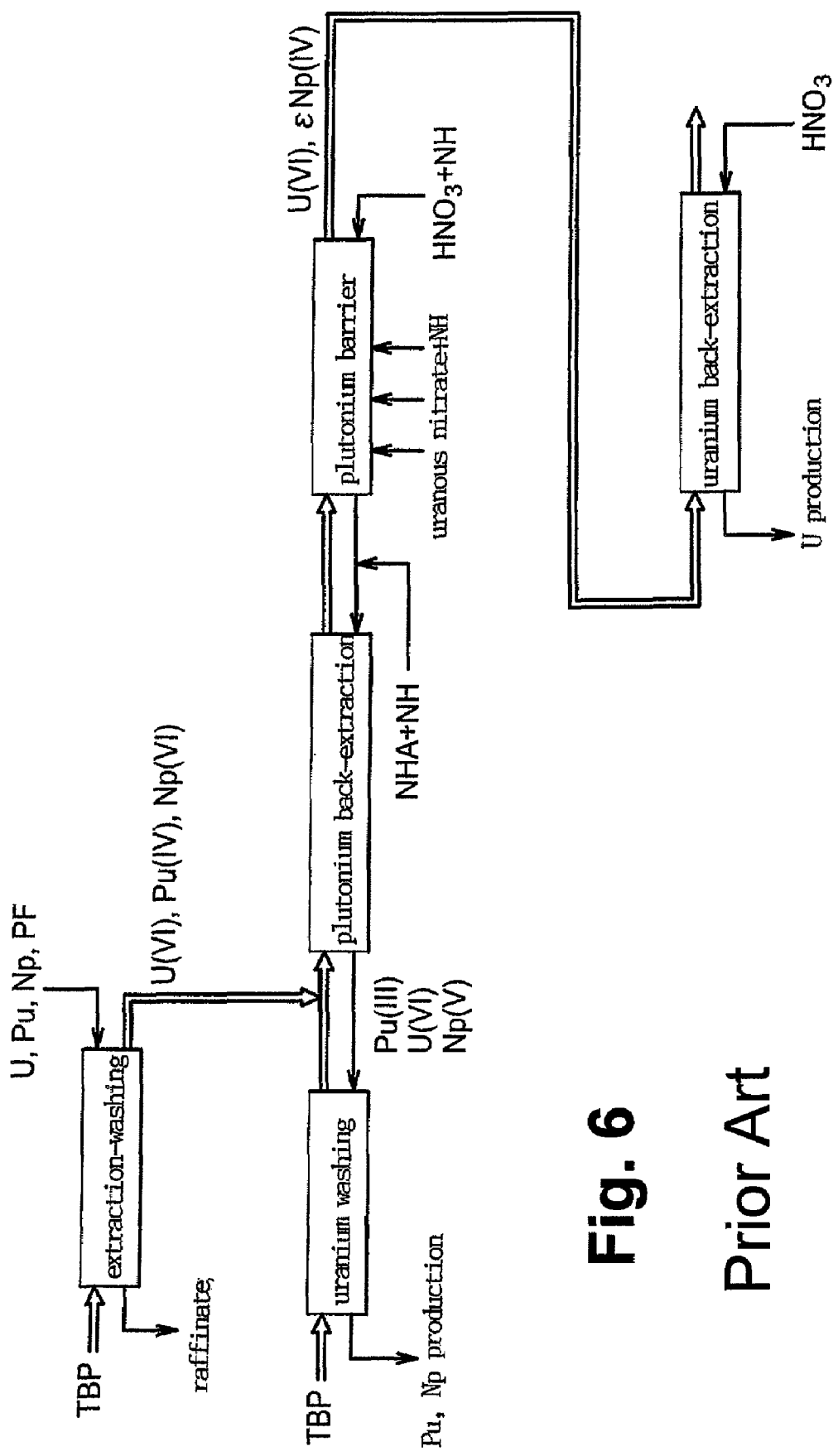
FIG. 6 represents a block diagram of a variant of the first purification cycle of the PUREX method, in which neptunium is recovered jointly with plutonium.

Reference will now be made to FIG. 6, which schematically presents a variant of the first purification cycle of the PUREX method as illustrated in FIG. 3, in which neptunium is recovered jointly with plutonium.

In this variant, the selective plutonium back-extraction is carried out with a reducing agent less energetic than uranous nitrate, for example hydroxylamine nitrate (NHA), which reduces neptunium(VI) to neptunium(V) that essentially cannot be extracted by the solvent phase used in the PUREX method.

The solvent phase laden with uranium therefore leaves the "plutonium back-extraction" zone while now containing only trace levels of neptunium and plutonium.

Figure 7:
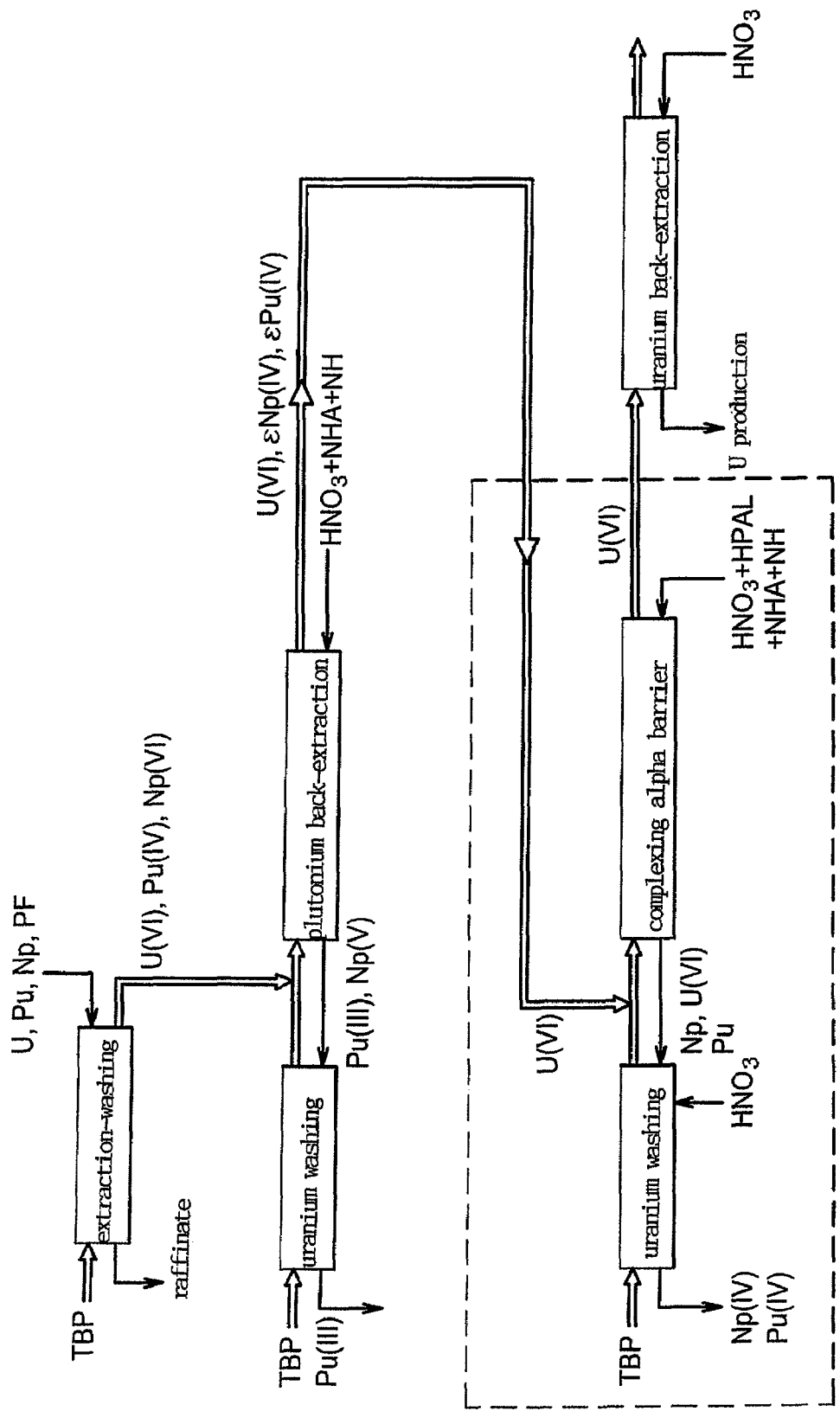
FIG. 7 represents a block diagram of an example of the method according to the invention being integrated in the variant of the first purification cycle of the PUREX method as illustrated in FIG. 6.

As shown in FIG. 7, the method according to the invention may nevertheless be used in this variant just after the "plutonium back-extraction" zone as an additional safety barrier making it possible to decontaminate the uranium, present in the solvent phase leaving this zone, with respect to neptunium and plutonium in the event that the latter have been incompletely back-extracted in the "plutonium back-extraction" zone.

In this case, with the solvent phase leaving the "plutonium back-extraction" zone not containing excess uranium(IV), the method according to the invention can be carried out without the prior oxidation step.

Furthermore, with the neptunium and plutonium normally being in oxidation state (IV) in this phase, it is possible to carry it out according to a diagram similar to that represented in FIG. 1, i.e. without adding a reducing agent or an antinitrous agent to the aqueous acidic solution used in the first "complexing alpha barrier" contactor.

However, as illustrated in FIG. 7, a beneficial option consists in applying the diagram of FIG. 2 and in using an aqueous acidic solution which, besides a lacunary heteropolyanion, contains hydroxylamine nitrate and hydrazine, at a temperature of the order of 45° C in order to overcome any possible malfunction of the "plutonium back-extraction" operation liable to entail incomplete reduction (or re-oxidation) of the neptunium and plutonium.

The aqueous phase leaving the second contactor ("uranium washing") which may possibly be laden with neptunium and/or plutonium, these being complexed by the HPAL, is removed from the cycle and sent to a vitrification unit.

The organic phase leaving the second contactor, laden with uranium(VI), is sent to the first contactor while the organic phase leaving the first contactor, laden with uranium(VI), is sent not to the "plutonium barrier" zone which can be omitted since it is made superfluous by the method according to the invention, but directly to the "uranium back-extraction" zone where the uranium(VI) will be back-extracted as is customary in the first purification cycle of the PUREX method as illustrated in FIG. 6.

The following examples correspond to experiments which were carried out in a laboratory and have validated the method according to the invention.

EXAMPLE 1

Separation of Uranium(VI) from Plutonium(IV) in Test Tubes

In this experiment, the organic phase containing the uranium(VI) and plutonium(IV) which are to be separated is a solution of tributyl phosphate at 30% strength by volume in hydrogenated tetrapropylene which contains uranium(VI) at a concentration of 80 g/l, plutonium(IV) at a concentration close to 50 mg/l and dibutyl phosphoric acid at a concentration of 100 mg/l. The latter is a breakdown product of tributyl phosphate, which is a strong complexing agent of plutonium (IV) and is therefore liable to impair the back-extraction of plutonium(IV) from the organic phase.

The aqueous acidic solutions used to back-extract the plutonium(IV) from the organic phase are solutions of nitric acid at strengths of 1 mole/l and 0.2 mole/l, which contain a silicotungstate in the form of a potassium salt at a concentration corresponding to a molar ratio, between this silicotungstate and the plutonium present in the organic phase, of between 2 and 3 with an organic phase/aqueous solution volume ratio of 10.

The organic phase and aqueous acidic solution are introduced into test tubes in an organic phase/aqueous solution volume ratio of 10. They are then mixed for 3, 5, 10 or 30 minutes by placing the test tubes on apparatus for vibrating agitation of this tube. The tubes are then centrifuged and the plutonium is assayed by radiometric techniques in the organic and aqueous phases thus separated.

Table 1 below presents the decontamination factors of the organic phase with respect to plutonium ($DF_{Pu}$) obtained as a function of the initial acidity of the aqueous solution used, and the mixing time of the organic phase and this solution. These decontamination factors correspond to the ratios between the plutonium concentrations detected in the organic phase before and after mixing with the aqueous acidic solution.

TABLE 1

| [HNO$_3$] | $DF_{Pu}$ Mixing time (min) | | | |
|---|---|---|---|---|
| (mole/l) | 3 | 5 | 10 | 30 |
| 1 | 36 | 55 | 114 | 248 |
| 0.2 | 48 | 65 | 100 | 216 |

It thus appears that less than 1% of the plutonium(IV) initially present in the organic phase remains in this phase when it is mixed for at least 10 minutes with a 1 M aqueous nitric solution containing a silicotungstate.

EXAMPLE 2

Separation of Uranium(VI) from Neptunium(VI) in Test Tubes

In this experiment, the organic phase containing the uranium(VI) and plutonium(IV) which are to be separated is a solution of tributyl phosphate at 30% strength by volume in hydrogenated tetrapropylene, which contains 80 g/l of uranium(VI) and about 50 mg/l of plutonium(VI) and which is prepared just before the experiment by mixing:

a solution of uranium(VI) at a strength of 80 g/l and nitric acid at a strength of 0.02 mole/l, and a solution of neptunium(VI) at a strength of 10 g/l and nitric acid at a strength of 0.05 mole/l, the latter having been obtained by bringing an organic phase in contact with an aqueous nitric phase (4M) containing $^{237}$Np previously oxidized to $^{237}$Np(VI) by AgO, and having been enriched with $^{239}$Np intended to act as a radioactive tracer for the neptunium assay.

In parallel, a series of aqueous acidic solutions having the following are prepared:

a nitric acid concentration of 2 or 3 moles/l, a hydroxylamine nitrate concentration of 0.05, 0.1 or 0.2 mole/l, a hydrazine concentration of 0.05 or 0.1 mole/l, and a silicotungstate concentration corresponding to a molar ratio between this silicotungstate and the neptunium, present in the organic phase, of 2 with an organic phase/aqueous solution volume ratio of 10.

The organic phase is introduced into test tubes jointly with one of the aqueous acidic solutions, in an organic phase/aqueous solution volume ratio of 10. They are then mixed for 1, 3, or 5 minutes. The tubes are then centrifuged.

Counting and α spectrometry are carried out on the organic and aqueous phases thus separated, in order to measure their $^{237}$Np concentration, while γ spectrometry is carried out on the same phases in order to measure their $^{239}$Np concentration.

Table 2 below presents the decontamination factors of the organic phase with respect to neptunium ($DF_{Np}$) obtained as a function of the initial acidity of the aqueous solution used, its concentration of hydroxylamine nitrate (NHA) and hydrazine (NH) and the mixing time of the organic phase and the aqueous solution. These decontamination factors correspond to the ratios between the neptunium concentrations detected in the organic phase before and after mixing with the aqueous acidic solution.

TABLE 2

| Aqueous acidic solution | | | $DF_{Np}$ | | |
|---|---|---|---|---|---|
| [HNO$_3$] | [NHA] | [NH] | Mixing time (min) | | |
| (moles/l) | (mole/l) | (mole/l) | 1 | 3 | 5 |
| 2 | 0.05 | 0.05 | | >5 | >7 |
| 2 | 0.1 | 0.1 | | 28 | 58 |
| 2 | 0.2 | 0.1 | | 36 | 66 |
| 3 | 0.2 | 0.1 | 14 | | |

These results demonstrate the good performance of the method according to the invention, even with relatively short contact times between the organic phase and the aqueous acidic solution.

EXAMPLE 3

Separation of Uranium(VI) from Neptunium(VI) in Laboratory Centrifugal Extractors Three tests of separating uranium(VI) from neptunium(VI) when they are present in the same organic phase are also carried out in laboratory centrifugal extractors.

Table 3 below presents the operating conditions used in these three tests and the decontamination factors of the organic phase with respect to neptunium ($DF_{Np}$) which were obtained.

In this table:

the column "[U]" indicates the initial concentration, expressed in g/l, of uranium(VI) in the organic phase used, the column "[Np]" indicates the initial concentration, expressed in mg/l, of neptunium(VI) in the organic phase used, the column "SiWo/Np" indicates the molar ratio between the silicotungstate present in the aqueous acidic solution used and the neptunium present in the organic phase used, the column "O/A" indicates the volume ratio between the organic phase used and the aqueous acidic solution used, the column "θ" indicates the mixing temperature, expressed in °C., of the organic phase and the aqueous acidic solution which are used, the column "Mixing time" indicates the mixing duration, expressed in seconds, of the organic phase and the aqueous acidic solution which are used, the column "[HNO$_3$]" indicates the initial acidity, expressed in moles/l, of the aqueous acidic solution used, the column "[NHA]" indicates the initial concentration, expressed in mole/l, of hydroxylamine nitrate in the aqueous acidic solution used, the column "[NH]" indicates the concentration, expressed in mole/l, of hydrazine in the aqueous acidic solution used, while the column "$DF_{Np}$" indicates the decontamination factor obtained for the organic phase with respect to neptunium.

TABLE 3

| Test No° | [U] (g/l) | [Np] (mg/l) | SiWO/Np | O/A | θ (° C.) | Mixing time (sec) | [HNO$_3$] (moles/l) | [NHA] (mole/l) | [NH] (mole/l) | $DF_{Np}$ |
|---|---|---|---|---|---|---|---|---|---|---|
| 1 | 81 | 76 | 3.7 | 7.5 | 60 | 106 | 2 | 0.1 | 0.2 | >18 |
| 2 | 80.3 | 84.4 | 3.7 | 7.5 | 50 | 106 | 2 | 0.1 | 0.2 | >16 |
| 3 | 79 | 90 | 1.8 | 7.5 | 50 | 106 | 2 | 0.1 | 0.2 | >16 |

The results of these tests confirm the good performance of the method according to the invention in laboratory apparatus which is more similar to the apparatus used on an industrial scale than test tubes are.

In so far as they are obtained for mixing times between the organic phase and the aqueous acidic solution comparable to those used in industrial contactors, they suggest that very high decontamination performances may be obtained if the method according to the invention is carried out for continuously treating an organic phase in multistage contactors, and that the second uranium purification cycle may be omitted in the scope of integrating the method according to the invention in the first purification cycle of the PUREX method.

DOCUMENTS CITED

[1] FR-A-2 731 717

The invention claimed is:

1. A method for separating uranium(VI) from one or more actinides(IV), said uranium(VI) and said one or more actinides(IV) being present in an organic phase which is immiscible with water and which contains an extractant, said method comprising the following steps:
    a) bringing said organic phase in contact with an aqueous acidic solution containing at least one lacunary heteropolyanion thereby stripping said one or more actinides(IV) from said organic phase without stripping said uranium; and
    b) separating said organic phase resulting from step a) from said aqueous solution resulting from step a) and thereby separating said uranium from said one or more actinides (IV).

2. A method according to claim 1, wherein the lacunary heteropolyanion is a heterotungstate selected from heterotungstates of formula $P_2W_{17}O_{61}^{10-}$, $As_2W_{17}O_{61}^{10-}$, $SiW_{11}O_{39}^{8-}$, $GeW_{11}O_{39}^{8-}$ and $PW_{11}O_{39}^{7-}$.

3. A method according to claim 2, wherein the heterotungstate is used in the form of an alkali metal salt.

4. A method according to claim 2, wherein the aqueous acidic solution contains silicotungstate of formula $SiW_{11}O_{39}^{8-}$.

5. A method according to claim 1, wherein the aqueous acidic solution contains silicotungstate of formula $SiW_{11}O_{39}^{8-}$ in the form of a potassium salt.

6. A method according to claim 1, wherein after the organic phase and the acidic solution are brought in contact, the molar ratio between the lacunary heteropolyanion and the one or more actinides(IV) to be separated from the uranium(VI) is from 2 to 10.

7. A method according to claim 1, wherein after the organic phase and the acidic solution are brought in contact, the molar ratio between the lacunary heteropolyanion and the one or more actinides(IV) to be separated from the uranium(VI) is from 2 to 5.

8. A method according to claim 1, wherein the ratio between the volumes of the organic phase and the aqueous acidic solution is from 5 to 10.

9. A method according to claim 1, wherein the aqueous acidic solution is a nitric acid solution.

10. A method according to claim 9, wherein the nitric acid solution has an HNO$_3$ concentration of between 0.5 and 3 moles/l.

11. A method according to claim 1, wherein step a) is carried out at a temperature of from 45 to 60° C.

12. A method according to claim 1, further comprising contacting the aqueous solution resulting from step b) with an organic phase which is immiscible with water and has an affinity for uranium(VI), then separating said aqueous solution from said organic phase.

13. A method according to claim 1, wherein the one or more actinides(IV) to be separated from the uranium(VI) are selected from the group consisting of thorium(IV), uranium (IV), and plutonium(IV).

14. A method for reprocessing an irradiated nuclear fuel comprising separating uranium(VI) from one or more actinides(IV) in said irradiated nuclear fuel, by
    a) bringing an organic phase, which is immiscible with water and contains an extractant, said uranium and said one or more actinides(IV), in contact with an aqueous acidic solution containing at least one lacunary heteropolyanion thereby stripping said one or more actinides(IV) from said organic phase without stripping said uranium; and
    b) separating said organic phase resulting from step a) from said aqueous solution resulting from step a), and thereby separating said uranium from said one or more actinides (IV).

15. A method for reprocessing an irradiated nuclear fuel comprising:
    i) co-extracting uranium(VI), plutonium(IV) and neptunium(VI) from a first aqueous acidic phase resulting from the dissolution of said nuclear fuel in an acid, by bringing said aqueous acidic phase in contact with an organic phase which is immiscible with water and which contains an extractant, and then by separating said first aqueous phase from said organic phase;

ii) back-extracting plutonium (III) from the organic phase resulting from step i) without back-extracting uranium and neptunium by bringing said organic phase in contact with a second aqueous acidic phase which contains uranium(IV) as a reducing agent capable of reducing plutonium(IV) into plutonium(III), and then by separating said organic phase and said second aqueous phase;

iii) oxidizing uranium(IV) and neptunium(IV) present in the organic phase resulting from step ii) into uranium (VI) and neptunium(VI);

which process further comprises the step of separating uranium(VI) from the neptunium(VI) present in the organic phase resulting from step iii), by a) bringing said organic phase in contact with a third aqueous acidic phase containing at least one lacunary heteropolyanion and a reducing agent capable of reducing neptunium(VI) without reducing uranium(VI), for stripping neptunium from said organic phase without stripping uranium; and b) separating the organic phase resulting from step a) from the aqueous phase resulting from step a) and thereby separating said uranium from neptunium.

16. A method for reprocessing an irradiated nuclear fuel comprising:

i) co-extracting uranium(VI), plutonium(IV) and neptunium(VI) from a first aqueous acidic phase resulting from the dissolution of said nuclear fuel in an acid, by bringing said aqueous acidic phase in contact with an organic phase which is immiscible with water and which contains an extractant, and then by separating said first aqueous phase from said organic phase;

ii) back-extracting plutonium in the oxidation state (III) and neptunium in the oxidation state (V) from the organic phase resulting from step i) without back-extracting uranium by bringing said organic phase in contact with a second aqueous acidic phase which contains a reducing agent capable of reducing plutonium(IV) into plutonium(III) and neptunium (VI) into neptunium(V), and then by separating said organic phase and said second aqueous phase;

which process further comprises the step of separating uranium(VI) present in the organic phase resulting from step ii) from traces of plutonium and neptunium which have not been back-extracted from the organic phase at step ii), by a) bringing said organic phase in contact with a third aqueous acidic phase containing at least one lacunary heteropolyanion, for stripping plutonium and uranium from said organic phase without stripping uranium; and b) separating the organic phase resulting from step a) from the aqueous phase resulting from step a) and thereby separating said uranium from neptunium.

17. A method according to claim 16, wherein step a) is carried out by using an aqueous nitric solution which has a molarity of 1 and contains the lacunary heteropolyanion, at ambient temperature.

18. A method according to claim 16, wherein step a) is carried out by using an aqueous nitric solution which has a molarity ranging from 2 to 3 and contains the lacunary heteropolyanion, hydroxylamine nitrate and hydrazine, at a temperature of 45° C.

19. A method according to claim 15, wherein step a) is carried out by using an aqueous nitric solution which has a molarity ranging from 2 to 3 and contains the lacunary heteropolyanion, hydroxylamine nitrate and hydrazine, at a temperature of 45° C.

* * * * *

UNITED STATES PATENT AND TRADEMARK OFFICE
CERTIFICATE OF CORRECTION

| | |
|---|---|
| PATENT NO. | : 7,622,090 B2 |
| APPLICATION NO. | : 10/549101 |
| DATED | : November 24, 2009 |
| INVENTOR(S) | : Dinh et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this

Twenty-sixth Day of October, 2010

David J. Kappos
*Director of the United States Patent and Trademark Office*